United States Patent
Cao et al.

(10) Patent No.: US 11,621,980 B2
(45) Date of Patent: Apr. 4, 2023

(54) SYSTEM AND METHOD FOR PROVIDING UPSTREAM DIRECTIVES BASED ON UPSTREAM SIGNAL QUALITY OF WIRELESS NETWORK IN REAL-TIME COMMUNICATION

(71) Applicant: Agora Lab, Inc., Santa Clara, CA (US)

(72) Inventors: Yue Cao, Shanghai (CN); Zhaoxu Wang, Shanghai (CN)

(73) Assignee: Agora Lab, Inc., Santa Clara, CA (US)

( * ) Notice: Subject to any disclaimer, the term of this patent is extended or adjusted under 35 U.S.C. 154(b) by 31 days.

(21) Appl. No.: 16/922,093

(22) Filed: Jul. 7, 2020

(65) Prior Publication Data
US 2022/0014567 A1    Jan. 13, 2022

(51) Int. Cl.
*H04L 65/1069* (2022.01)
*H04W 24/08* (2009.01)
*H04W 84/12* (2009.01)
*H04W 88/08* (2009.01)

(52) U.S. Cl.
CPC ......... *H04L 65/1069* (2013.01); *H04W 24/08* (2013.01); *H04W 84/12* (2013.01); *H04W 88/08* (2013.01)

(58) Field of Classification Search
CPC ... H04L 65/1069; H04L 65/80; H04L 69/162; H04L 67/141; H04W 24/08; H04W 84/12; H04W 88/08; H04W 76/10
See application file for complete search history.

(56) References Cited

U.S. PATENT DOCUMENTS

| | | | |
|---|---|---|---|
| 9,292,414 B2 | 3/2016 | Kiel et al. | |
| 9,306,829 B1 | 4/2016 | Boyle et al. | |
| 9,320,019 B2 | 4/2016 | Gallagher et al. | |
| 9,805,202 B2 | 10/2017 | Medeiros et al. | |
| 2014/0301389 A1* | 10/2014 | Bajpai | H04L 69/161 370/389 |
| 2015/0156099 A1* | 6/2015 | Okamoto | H04L 43/00 709/224 |
| 2015/0189659 A1* | 7/2015 | Mussot | H04L 43/0894 370/329 |
| 2016/0112166 A1 | 11/2016 | Hundal et al. | |

* cited by examiner

*Primary Examiner* — Chi H Pham
*Assistant Examiner* — Raul Rivas
(74) *Attorney, Agent, or Firm* — The Law Offices of Konrad Sherinian LLC; Depeng Bi (57) ABSTRACT

A method for determining and providing upstream directives in real-time communication over a wireless network is performed by an RTC/RTE application running on a mobile device and an access point application running on a Wi-Fi access point. The access point application determines the values of a set of upstream Wi-Fi signal quality parameters including at least one of an upstream RSSI parameter, an upstream SNR parameter, an upstream link speed parameter, and an upstream remaining bandwidth parameter of the mobile device. Each value is compared to a set of upstream thresholds to derive an upstream Wi-Fi connection quality measure. Each set of upstream thresholds includes at least two different values. The RTC/RTE application determines an upstream directive from the upstream Wi-Fi connection quality measure, and presents the upstream directive to a user in an audio or video form.

14 Claims, 7 Drawing Sheets

SYSTEM AND METHOD FOR PROVIDING UPSTREAM DIRECTIVES BASED ON UPSTREAM SIGNAL QUALITY OF WIRELESS NETWORK IN REAL-TIME COMMUNICATION

CROSS REFERENCE TO RELATED APPLICATIONS

This application is related to U.S. patent application Ser. No. 16/926,871, entitled "SYSTEM AND METHOD FOR CLASSIFYING NETWORK DATA PACKETS WITH PROVIDED CLASSIFIER IDENTIFIERS," filed Jul. 13, 2020, assigned to Agora Lab, Inc. of Santa Clara, Calif., and which is hereby incorporated by reference. This application is also related to U.S. patent application Ser. No. 16/926,855, entitled "SYSTEM AND METHOD FOR AUTOMATICALLY SWITCHING REAL-TIME COMMUNICATION DEVICE TO NEW BASIC SERVICE SET," filed Jul. 13, 2020, assigned to Agora Lab, Inc. of Santa Clara, Calif., and which is hereby incorporated by reference.

FIELD OF THE DISCLOSURE

The present invention generally relates to wireless communication, and more particularly relates to real-time communication over a wireless network. More particularly still, the present disclosure relates to a system and method for providing upstream directives based on the upstream quality measures of a wireless network in real-time communication.

DESCRIPTION OF BACKGROUND

Wi-Fi is a family of wireless networking technologies that are based on the IEEE 802.11 family of technical standards. Wi-Fi (also referred to herein as WiFi) technologies are commonly used for local area networking of electronic devices and Internet access. The electronic devices can be smartphones, tablet computers, laptop computers, desktop computers, and other types of devices. A Wi-Fi access point creates a local wireless network, and is operatively coupled to the Internet via, for example, a broadband modem. The broadband modem bridges the communication between the Wi-Fi access point and the Internet. Electronic devices access the Wi-Fi access point to access the Internet and communicate with each other. The Wi-Fi access point could also be a Wi-Fi hotspot. In such a case, the Wi-Fi hotspot can be created from, for example, a wireless access point, or a smartphone that accesses a public cellular network for accessing the Internet. The Wi-Fi hotspot can be provided by, for example, a public cellular network. As used herein, Wi-Fi access points and Wi-Fi hotspots are collectively referred to as Wi-Fi access points.

Electronic devices access the Wi-Fi network for many purposes. For instance, a mobile device (such as a smartphone, a tablet computer or a laptop computer) or a desktop computer runs a real-time communication application for audio, voice, video or both audio and video communication, such as instant messaging, voice over IP ("VoIP"), video teleconferencing, and online virtual meeting. Real-time communication ("RTC") and Real-Time Engagement ("RTE") (collectively referred to herein as "RTC/RTE") are the near simultaneous exchange of information over any type of telecommunications service with negligible latency. The immediacy of RTC/RTE is critically important for users. RTC/RTE software applications can be built in compliance with, for example, the Web Real-Time Communication ("WebRTC") framework.

An RTC/RTE software application running on a wireless networked device sends data (such as voice data, video data, text data, etc.) from the electronic device on which it is running to other electronic devices or servers. The data is sent from the electronic device to the Wi-Fi access point in the form of wireless signals, and referred to herein as upstream. The RTC/RTE software application also receives data (such as voice data, video data, text data, etc.) from other electronic devices or servers. The data is sent from the Wi-Fi access point to the electronic device in the form of wireless signals as well, and referred to herein as downstream. Downstream is received by the electronic device from the Wi-Fi access point while upstream is transmitted by the electronic device to the Wi-Fi access point.

The quality of the Wi-Fi access point's Wi-Fi signal can vary depending on the relative location, interference from other devices, conditions under which a mobile device accesses the Wi-Fi access point, and other factors. When the quality of the Wi-Fi signal is lower, the quality of users' experience ("QoE") of the RTC/RTE application becomes lower. QoE can be described and measured by a number of parameters, such as video resolution, choppy video time, video sharpness (also known as video clarity) and choppy audio time, latency, etc.

However, the mobile device running the RTC/RTE application can only provide users the wireless connection quality information of the Wi-Fi signal for the downstream connection. It does not have information about its upstream Wi-Fi network connection quality. By design, the mobile device's transmit ("Tx") power is much smaller that the Tx power of the Wi-Fi access point. At the same time, the Wi-Fi access point has the capability to obtain data about the mobile device's upstream wireless network signal quality.

Accordingly, it is desirable for RTC/RTE applications to dynamically and automatically detect upstream issues with Wi-Fi signal and provide upstream feedback to users of the RTC/RTE applications. In particular, it is desirable for the RTC/RTE applications to provide different types of upstream directives to users. The different types of upstream directives are based on different types of upstream issues with the Wi-Fi network obtained from the Wi-Fi access point. The upstream directives are desired to help resolving or alleviating the Wi-Fi network issues.

SUMMARY OF THE DISCLOSURE

Generally speaking, pursuant to the various embodiments, the present disclosure provides a method for determining and providing upstream directives in real-time communication and real-time engagement over a wireless network. The method is performed by an RTC/RTE application and a wireless access point application. The method includes creating a socket with a predetermined port on an IP address of a wireless access point by the wireless access point application running on a wireless access point. The wireless access point is adapted to create a wireless network. The method also includes establishing a connection with the RTC/RTE application running on a mobile device over the socket, determining a set of values of a set of upstream connection quality parameters of the mobile device, and sending the set of values to the n application over the socket by the wireless access point application. Furthermore, the method includes receiving the set of values, determining a set of upstream connection quality measures based on the set of values, determining a set of upstream directives based on the set of upstream connection quality measures, and presenting the set of upstream directives by the RTC/RTE application. The wireless access point is a Wi-Fi access point and the predetermined port is a TCP port or a UDP port. The set of upstream connection quality parameters includes at least one of an upstream RSSI parameter, an upstream SNR parameter, an upstream link speed parameter, and an upstream remaining bandwidth parameter. The set of values includes at least one of an upstream RSSI value, an upstream SNR value, an upstream link speed value, and an upstream remaining bandwidth value. The set of upstream connection quality measures includes at least one of an upstream RSSI quality measure, an upstream SNR quality measure, an upstream link speed quality measure, and an upstream remaining bandwidth quality measure. The RTC/RTE application determines the upstream RSSI quality measure by comparing the upstream RSSI value to a set of upstream RSSI thresholds. The upstream RSSI quality measure is set to low when the upstream RSSI value is below a first upstream RSSI threshold within the set of upstream RSSI thresholds. The RTC/RTE application determines the upstream SNR quality measure by comparing the upstream SNR value to a set of upstream SNR thresholds. The upstream SNR quality measure is set to low when the upstream SNR value is below a first upstream SNR threshold within the set of upstream SNR thresholds. The RTC/RTE application determines the upstream link speed quality measure by comparing the upstream link speed value to a set of upstream link speed thresholds. The upstream SNR quality measure is set to low when the upstream link speed value is below a first upstream link speed threshold within the set of upstream link speed thresholds. The RTC/RTE application determines the upstream remaining bandwidth quality measure by comparing the upstream remaining bandwidth value to a set of upstream remaining bandwidth thresholds. The upstream remaining bandwidth quality measure is set to low when the upstream remaining bandwidth value is below a first upstream remaining bandwidth threshold within the set of upstream remaining bandwidth thresholds. The method further includes listening to the socket for a connection request from the RTC/RTE application running on the RTC/RTE mobile device on the socket by the wireless access point application, and requesting to connect the wireless access point application over the socket by the RTC/RTE application. The RTC/RTE application presents the set of upstream directives in an audio format or a video format.

Further in accordance with the present teachings is a method for determining and providing upstream directives in real-time communication and real-time engagement over a wireless network. The method is performed by an RTC/RTE application and a wireless access point application. The method includes creating a socket with a predetermined port on an IP address of a wireless access point by the wireless access point application running on a wireless access point. The wireless access point is adapted to create a wireless network. The method further includes establishing a connection with the RTC/RTE application running on an electronic device over the socket, determining a set of values of a set of upstream connection quality parameters of the electronic device, determining a set of upstream connection quality measures based on the set of values, and sending the set of upstream connection quality measures to the RTC/RTE application over the socket by the wireless access point application. In addition, the method includes determining a set of upstream directives based on the set of upstream connection quality measures, and presenting the set of upstream directives in an audio format or a video format by the RTC/RTE application. The wireless access point is a Wi-Fi access point and the predetermined port is a TCP port or a UDP port. The set of upstream connection quality parameters includes at least one of an upstream RSSI parameter, an upstream SNR parameter, an upstream link speed parameter, and an upstream remaining bandwidth parameter. The set of values includes at least one of an upstream RSSI value, an upstream SNR value, an upstream link speed value, and an upstream remaining bandwidth value. The set of upstream connection quality measures includes at least one of an upstream RSSI quality measure, an upstream SNR quality measure, an upstream link speed quality measure, and an upstream remaining bandwidth quality measure. The RTC/RTE application determines the upstream RSSI quality measure by comparing the upstream RSSI value to a set of upstream RSSI thresholds. The RTC/RTE application determines the upstream SNR quality measure by comparing the upstream SNR value to a set of upstream SNR thresholds. The RTC/RTE application determines the upstream link speed quality measure by comparing the upstream link speed value to a set of upstream link speed thresholds. The RTC/RTE application determines the upstream remaining bandwidth quality measure by comparing the upstream remaining bandwidth value to a set of upstream remaining bandwidth thresholds. The upstream RSSI quality measure is set to low when the upstream RSSI value is below a first upstream RSSI threshold within the set of upstream RSSI thresholds. The upstream SNR quality measure is set to low when the upstream SNR value is below a first upstream SNR threshold within the set of upstream SNR thresholds. The upstream SNR quality measure is set to low when the upstream link speed value is below a first upstream link speed threshold within the set of upstream link speed thresholds. The upstream remaining bandwidth quality measure is set to low when the upstream remaining bandwidth value is below a first upstream remaining bandwidth threshold within the set of upstream remaining bandwidth thresholds. The method further includes listening to the socket for a connection request from the RTC/RTE application running on the RTC/RTE electronic device on the socket by the wireless access point application, and requesting to connect the wireless access point application over the socket by the RTC/RTE application.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Although the characteristic features of this disclosure will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

A person of ordinary skills in the art will appreciate that elements of the figures above are illustrated for simplicity and clarity, and are not necessarily drawn to scale. The dimensions of some elements in the figures may have been exaggerated relative to other elements to help understanding of the present teachings. Furthermore, a particular order in which certain elements, parts, components, modules, steps, actions, events and/or processes are described or illustrated may not be actually required. A person of ordinary skill in the art will appreciate that, for the purpose of simplicity and clarity of illustration, some commonly known and well-understood elements that are useful and/or necessary in a commercially feasible embodiment may not be depicted in order to provide a clear view of various embodiments in accordance with the present teachings.

DETAILED DESCRIPTION

Figure 1:
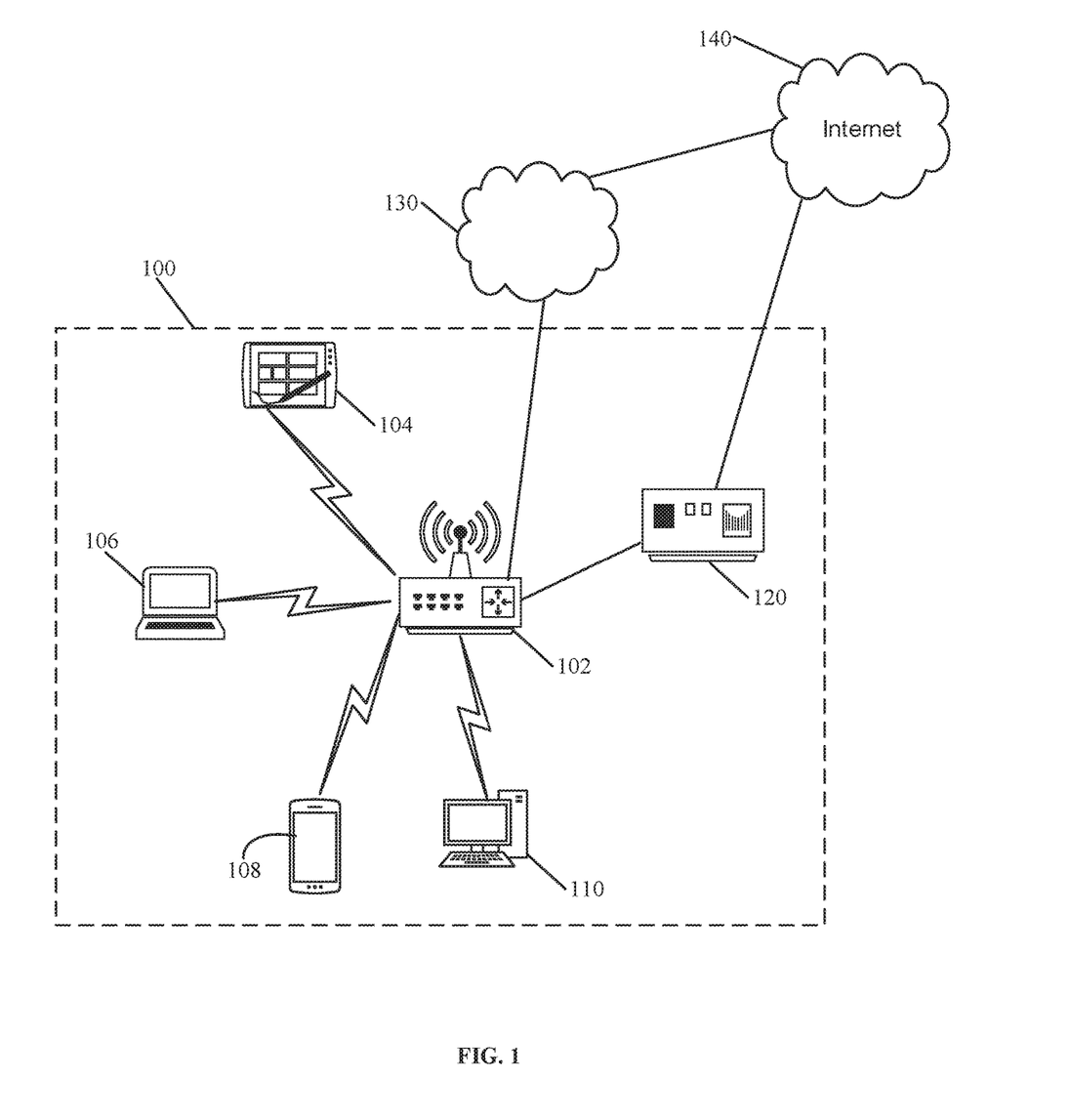
FIG. 1 is an illustrative block diagram of a Wi-Fi wireless network in accordance with the teachings of this disclosure.

Turning to the Figures and to FIG. 1 in particular, an illustrative block diagram of a wireless communication network is shown and generally indicated at 100. The Wi-Fi network 100 includes a Wi-Fi access point 120 connecting to the Internet 140 via the broadband access device (such as a broadband modem) 120 or a public cellular network 130, and a set of electronic devices, such as the tablet computer 104, the laptop computer 106, the smartphone 108 and the desktop computer 110. The electronic devices 104-108 are mobile devices. The devices 104-110 each run an improved RTC/RTE software application while the Wi-Fi access point 102 runs an improved Wi-Fi access point software application.

Figure 2:
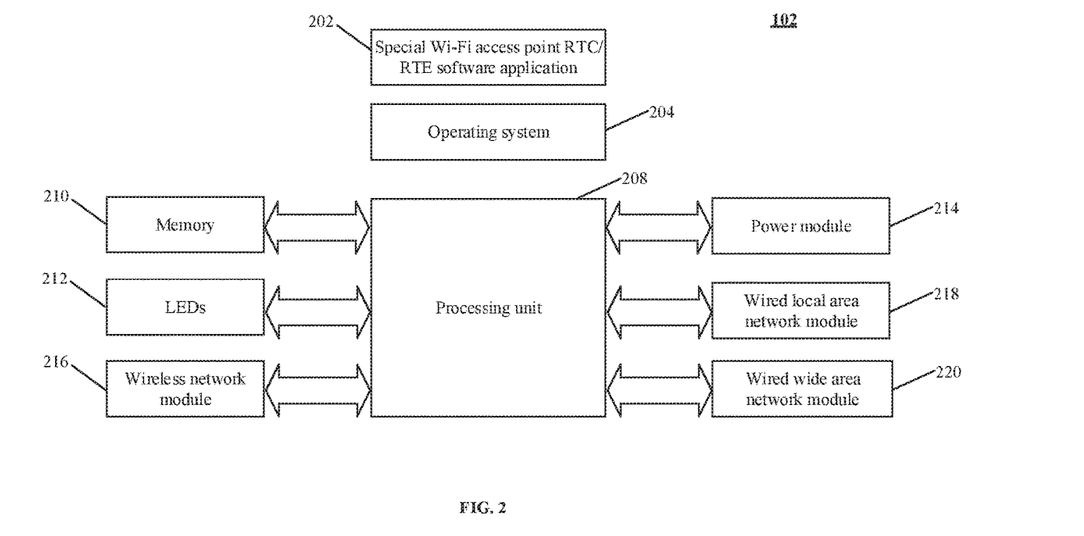
FIG. 2 is illustrative block diagram of a Wi-Fi wireless network access point in accordance with this disclosure.

The improved Wi-Fi access point 102 is further illustrated by reference to FIG. 2. Turning to FIG. 2, an illustrative block diagram of the Wi-Fi access point 102 is shown. The Wi-Fi access point 102 include a processing unit 208, some amount of memory 210 operatively coupled to the processing unit 208, a set of LED indicators 212 operatively coupled to the processing unit 208, a Wi-Fi wireless network module 216 operatively coupled to the processing unit 208, a power module 214 operatively coupled to the processing unit 208, a wired local area network module (such as Ethernet network) 218 operatively coupled to the processing unit 208, and a wired wide area network module 220 operatively coupled to the processing unit 208 for interfacing with the Internet gateway 120. The Wi-Fi access point 102 include an operating system 204, such as the LEDE/OpenWRT operating system, and Linux operating systems.

Figure 3:
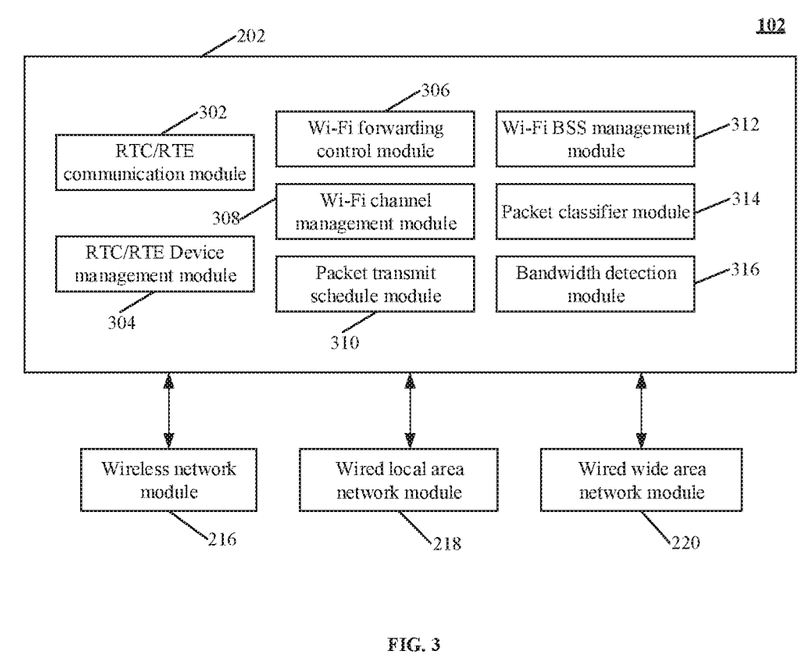
FIG. 3 is illustrative block diagram of a Wi-Fi wireless network access point in accordance with this disclosure.

The improved Wi-Fi access point 102 further includes a special Wi-Fi access point software application 202 in accordance with the present teachings. The special Wi-Fi access point software application 202 is further illustrated by reference to FIG. 3. Referring now to FIG. 3. Referring now to FIG. 3, an illustrative block diagram of the Wi-Fi access point 102 is shown. The special Wi-Fi access point software application 202 is one or more computer software programs written in one or more computer programming languages, such as C, C++, Java, etc.

The improved Wi-Fi access point software application 202 includes an RTC/RTE communication module 302 for configuring and managing the RTC/RTE communication with the mobile devices 104-108, an RTC/RTE device management module 304 for managing the association between RTC/RTE devices and the Wi-Fi access point 102, a Wi-Fi forwarding control module 306 for priority mapping and transmitting packet based on the packet priority on the network interfaces 216-220, a Wi-Fi channel management module 308 for managing wireless communication channels and determining the optimal channels for different communication needs, a packet transmit schedule module 310 for scheduling all egress packet based on packet priority on the network interfaces 216-220, a Wi-Fi BSS management module 312 for creating and terminating BSSes, a packet classifier module 314 for configuring hardware classifier, identifying each ingress packet and setting a priority for the packet, and a bandwidth detection module 316 for determining and managing remaining bandwidth of the network interfaces 216-220.

Each of the devices 104-110 includes a processing unit, some amount of memory operatively coupled to the processing unit, a display screen operatively coupled to the processing unit, a wireless network interface operatively coupled to the processing unit and configured to communicate with the Wi-Fi access point 102, and an operating system (such as iOS, Android and Windows 10). They may each include one or more user input interfaces, such as a voice input interface, a touch panel, a mouse, a keyboard, etc. As used herein, a wireless networked device running an RTC/RTE software application is referred to as an RTC/RTE device.

Figure 4:
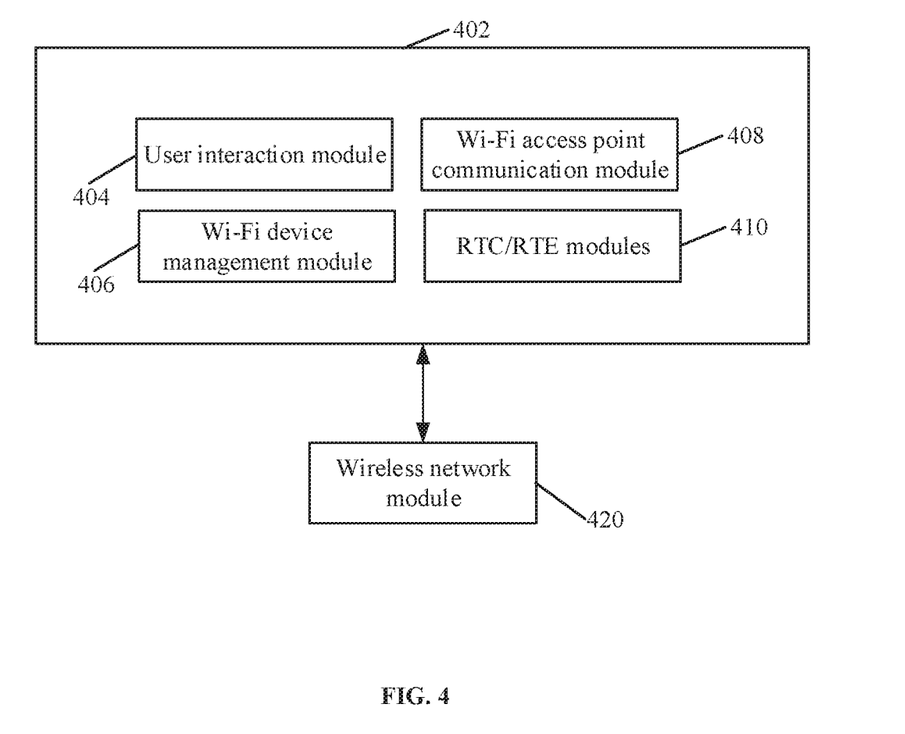
FIG. 4 is illustrative block diagram of a wireless real-time communication electronic device running on an electronic device in accordance with this disclosure.

Referring to FIG. 4, an illustrative block diagram of the RTC/RTE software application running on a mobile device (such as the electronic devices 104-110) is shown and generally indicated at 402. The special RTC/RTE software application 402 is one or more software programs written in one or more computer programming languages, such as C, C++, Java, etc. The RTC/RTE application 402 communicates with the same or different RTC/RTE software applications running other remote electronic devices via the wireless network interface 420 of the mobile device. The RTC/RTE program 402 includes a set of components. In one implementation, it includes a user interaction module 404 for interacting with a user of the RTC/RTE software application 402, a Wi-Fi device management module 406 for accessing and managing the wireless network device 420, an Wi-Fi access point communication module 408 for configuring the wireless connection and exchanging data with the Wi-Fi access point 102, and one or more RTC/RTE modules 410 for providing real-time communication functionality, such as video and audio modules.

Figure 5:
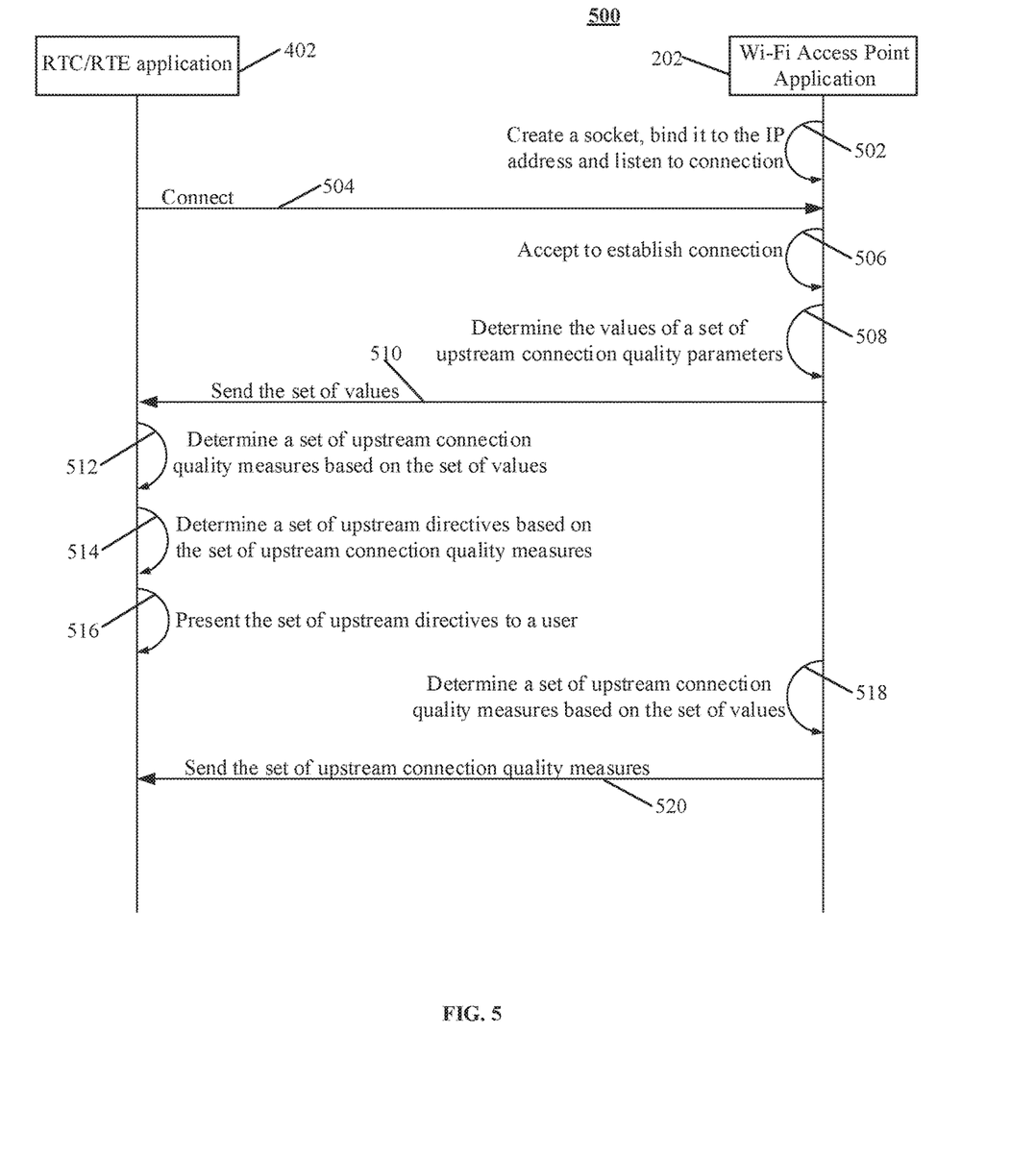
FIG. 5 is a sequence diagram illustrating the process by which a new real-time communication application determines its upstream wireless network quality issues in accordance with this disclosure.

The special RTC/RTE application 202 and the special Wi-Fi access point application 202 cooperate for determining the RTC/RTE application's 202 upstream connection issues to provide upstream directives to a user. The interaction between them is further illustrated by reference to FIG. 5. Referring now to FIG. 5, a sequence diagram illustrating the process by which the special RTC/RTE application 202 determines its upstream wireless network quality issues is shown and generally indicated 500.

At 502, the new access point application 202 creates a socket with a predetermined TCP port or an UDP port, binds the socket to an Internet Protocol ("IP") address of the Wi-Fi access point 102, and listens on the socket for connection requests from the RTC/RTE application 402. TCP stands for Transmission Control Protocol while UDP stands for User Datagram Protocol. At 504, the RTC/RTE application 402 attempts to connect to the socket. Connection request to this particular socket indicates that the software application 402 is an RTC/RTE software application and the device 402 is an RTC/RTE device. At 506, the access point application 202 accepts the connection request and establishes a connection between the special applications 202 and 402.

At 508, the improved access point application 202 determines the values of a set of upstream connection quality parameters of the mobile device running the RTC/RTE application 402. The set of values cannot be obtained by RTC/RTE application 402 from the electronic device it is running on. Instead, they can only be obtained by the Wi-Fi access point 102. Each value corresponds to a parameter within the set of parameters. In one implementation, the element 508 is periodically performed. Alternatively, the element 508 is triggered by a request from the RTC/RTE application 402 or a different event. The set of upstream connection quality parameters includes, for example, an upstream RSSI parameter, an upstream SNR parameter, an upstream link speed parameter, and an upstream remaining bandwidth parameter. RSSI stands for Received Signal Strength Indicator measuring the power level of upstream wireless signal of the mobile device that is received by the access point 102. SNR stands for Signal to Noise. In one implementation, remaining bandwidth is measured per network interface.

Figure 7:
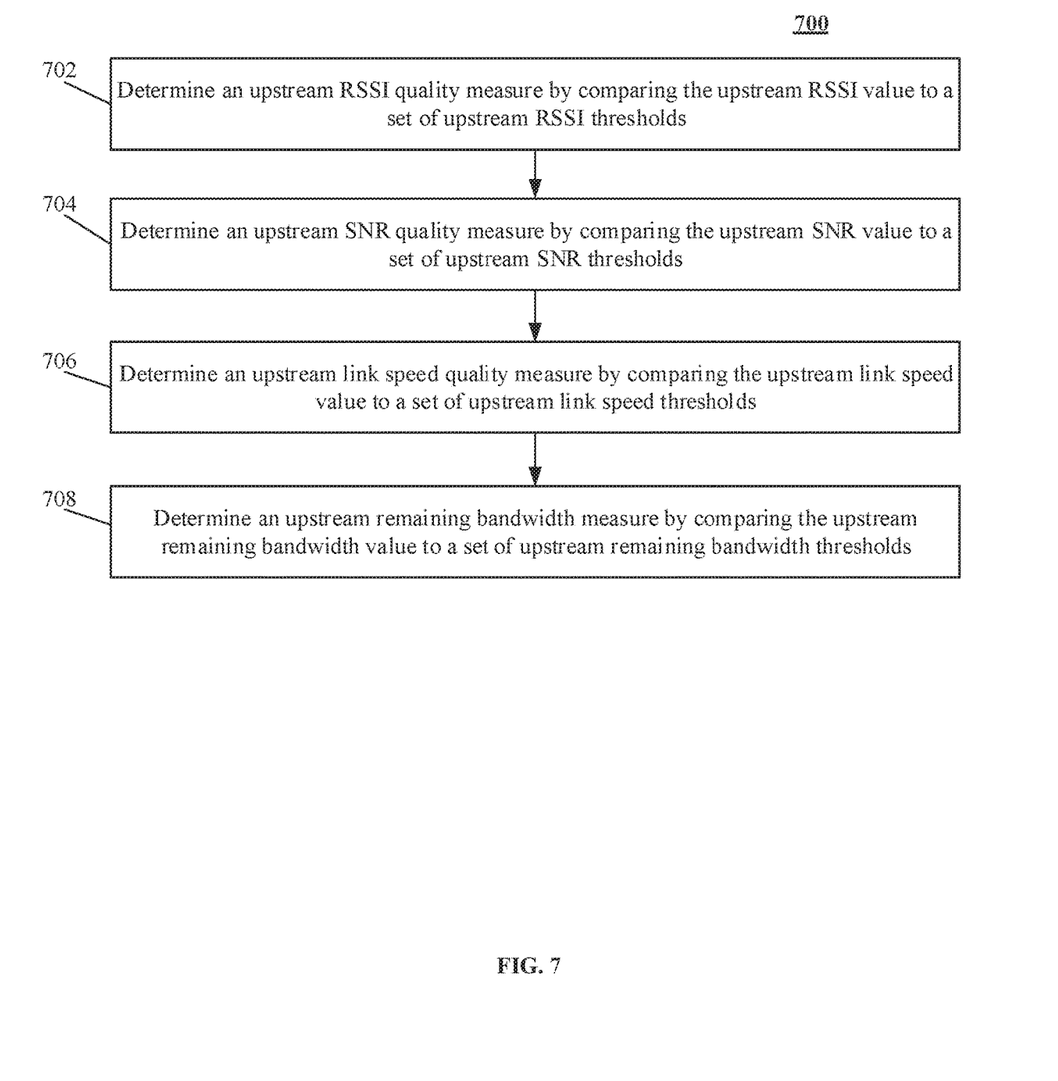
FIG. 7 is a flowchart illustrating a process by which a new real-time communication application determines a set of upstream connection quality measures in accordance with this disclosure.

At 510, the Wi-Fi access point application 202 sends the set of values to the RTC/RTE application 402 over the socket. At 512, the RTC/RTE application 402 receives the set of values, and determines a set of upstream connection quality measures from the set of values. The determination is further illustrated by reference to FIG. 7. Turning now to FIG. 7, a flowchart illustrating the process by which the RTC/RTE application 402 determines the set of upstream connection quality measures is shown and generally indicated at 700. At 702, the RTC/RTE application 402 determines an upstream RSSI quality measure by comparing the upstream RSSI value within the set of values to a set of upstream RSSI thresholds. For example, the set of upstream RSSI thresholds includes −80 dBm and −65 dBm. When the upstream RSSI value is less than the threshold −80 dBm, the upstream RSSI quality measure is set to, for example, low. When the upstream RSSI value is bigger than the threshold −65 dBm, the upstream RSSI quality measure is set to, for example, high.

At 704, the RTC/RTE application 402 determines an upstream SNR quality measure by comparing the upstream SNR value within the set of values to a set of upstream SNR thresholds. For example, the set of upstream SNR thresholds includes 15 dB and 30 dB. When the upstream SNR value is less than the threshold 15 dB, the upstream SNR quality measure is set to, for example, low. When the upstream SNR value is bigger than the threshold 30 dB, the upstream SNR quality measure is set to, for example, high.

At 706, the RTC/RTE application 402 determines an upstream link speed quality measure by comparing the upstream link speed value within the set of values to a set of upstream link speed thresholds. For example, the set of upstream link speed thresholds includes two (2) and four (4). When the upstream link speed value is less than the threshold of two times the required bandwidth, the upstream link speed quality measure is set to, for example, low. When the upstream link speed value is bigger than the threshold of four times the required bandwidth, the upstream link speed quality measure is set to, for example, high. The required bandwidth is the bandwidth required by the RTC/RTE application 402 to achieve an acceptable level of QoE, and is measured in Mbps (standing for megabits per second). The required bandwidth is determined by a number of factors, such as the video frames per second, resolution of the video of the RTC/RTE application 402, the number of channels of the RTC/RTE communication.

Alternatively, the set of upstream link speed thresholds includes percentage values, such as 25 and 75. In such a case, when the upstream link speed value is less than 25% of the maximum link speed, the upstream link speed quality measure is set to, for example, low; and when the upstream link speed value is bigger than 75% of the maximum link speed, the upstream link speed quality measure is set to high.

At 708, the RTC/RTE application 402 determines an upstream remaining bandwidth quality measure by comparing the upstream remaining bandwidth value within the set of values to a set of upstream remaining bandwidth thresholds. For example, the set of upstream remaining bandwidth thresholds includes two (2) and four (4). When the upstream remaining bandwidth value is less than the threshold of two times the required bandwidth, the upstream remaining bandwidth quality measure is set to, for example, low. When the upstream remaining bandwidth value is bigger than the threshold of four times the required bandwidth, the upstream remaining bandwidth quality measure is set to, for example, high. The remaining bandwidth is the bandwidth of the present wireless channel between the mobile device and the access point 102 that is still available for data transmission, and is measured in Mbps.

Figure 6:
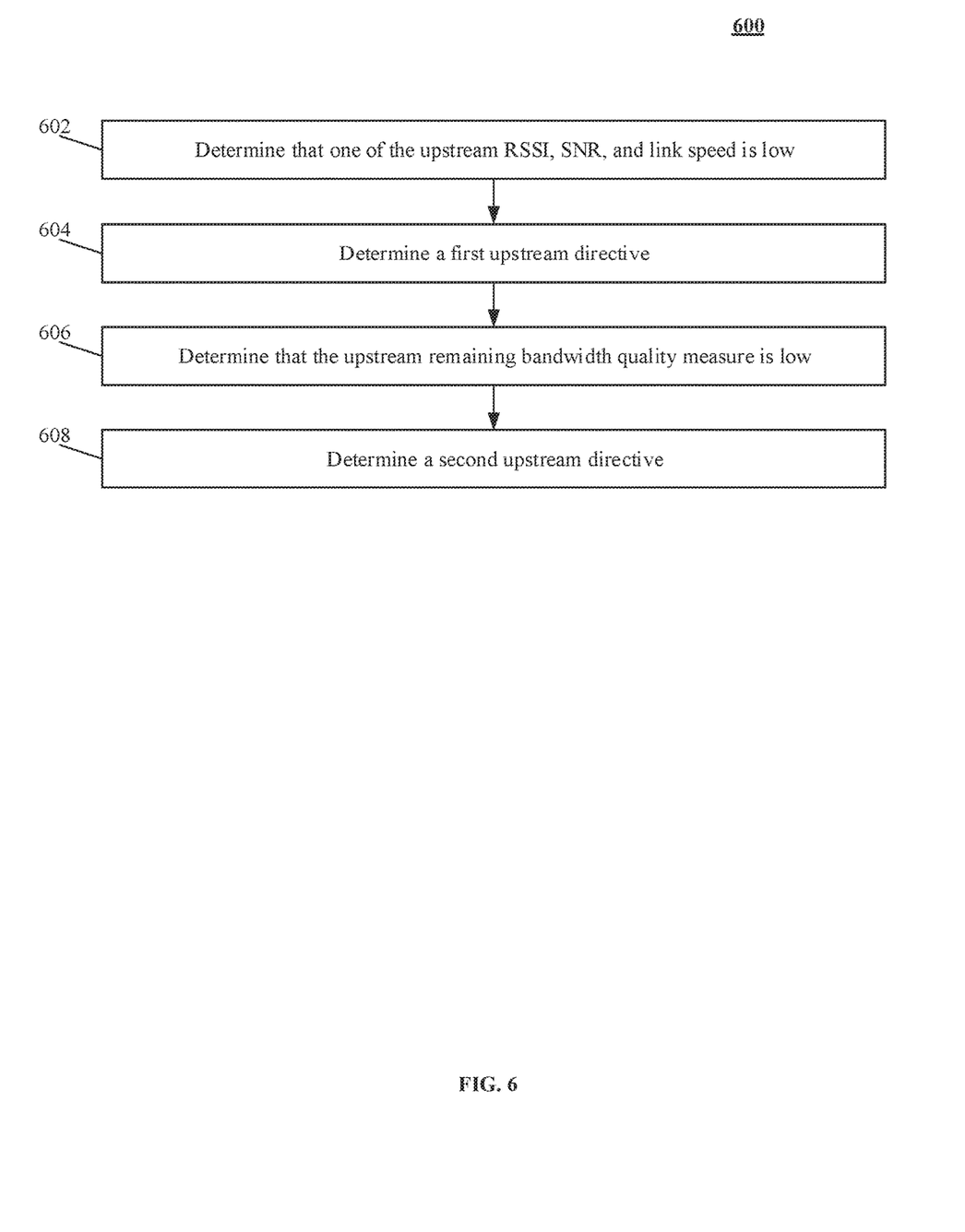
FIG. 6 is a flowchart illustrating a process by which a new real-time communication application determines a set of upstream directives in accordance with this disclosure.

Turning back FIG. 5, at 514, the RTC/RTE application 402 determines a set of upstream directives based on the set of upstream connection quality measures. The determination is further illustrated by reference to FIG. 6. Turning now to FIG. 6, a flowchart illustrating a process by which the RTC/RTE application 402 determines the set of upstream directives is shown and generally indicated at 600. At 602, the RTC/RTE application 402 determines that one of the upstream RSSI quality measure, the upstream SNR quality measure, and the upstream link speed quality measure is low. In such a case, at 604, the RTC/RTE application 402 determines a first upstream directive. The first upstream directive is, for example, "move closer to the Wi-Fi access point."

At 606, the RTC/RTE application 402 determines that one of the upstream remaining bandwidth quality measure is low. In such a case, at 608, the RTC/RTE application 402 determines a second upstream directive. The second upstream directive is, for example, "too many applications require Wi-Fi network bandwidth."

Turning back to FIG. 5, at 516, the RTC/RTE application presents the set of upstream directives to a user. Oftentimes, the set of upstream directives likely contains only one upstream directive. The set of upstream directives is presented to the user through, for example, a voice output, a video indicator on the display screen of the mobile device, or a text display on the display screen of the mobile device. The voice output is of an audio format while the video indicator and the text display are of video formats. In a different implementation, the element 512 is performed by the improved access point application 202 at 518. In such a case, at 520, the set of upstream connection quality measures is sent to the RTC/RTE application 402 through the socket.

Obviously, many additional modifications and variations of the present disclosure are possible in light of the above teachings. Thus, it is to be understood that, within the scope of the appended claims, the disclosure may be practiced otherwise than is specifically described above.

The foregoing description of the disclosure has been presented for purposes of illustration and description, and is not intended to be exhaustive or to limit the disclosure to the precise form disclosed. The description was selected to best explain the principles of the present teachings and practical application of these principles to enable others skilled in the art to best utilize the disclosure in various embodiments and various modifications as are suited to the particular use contemplated. It should be recognized that the words "a" or "an" are intended to include both the singular and the plural. Conversely, any reference to plural elements shall, where appropriate, include the singular.

It is intended that the scope of the disclosure not be limited by the specification, but be defined by the claims set forth below. In addition, although narrow claims may be presented below, it should be recognized that the scope of this invention is much broader than presented by the claim(s). It is intended that broader claims will be submitted in one or more applications that claim the benefit of priority from this application. Insofar as the description above and the accompanying drawings disclose additional subject matter that is not within the scope of the claim or claims below, the additional inventions are not dedicated to the public and the right to file one or more applications to claim such additional inventions is reserved.

What is claimed is:

1. A method for determining and providing upstream directives in real-time communication and real-time engagement over a wireless network, said method performed by an RTC/RTE application and a wireless access point application and comprising:
   a) creating a socket with a predetermined port on an IP address of a wireless access point by said wireless access point application running on a wireless access point, wherein said wireless access point is adapted to create a wireless network, and is Wi-Fi access point, and wherein said predetermined port is a TCP port or a UDP port;
   b) said wireless access point application establishing a connection with said RTC/RTE application running on a mobile device over said socket;
   c) said wireless access point application determining a set of values of a set of upstream connection quality parameters of said mobile device;
   d) said wireless access point application sending said set of values to said RTC/RTE application over said socket;
   e) said RTC/RTE application receiving said set of values;
   f) said RTC/RTE application determining a set of upstream connection quality measures based on said set of values;
   g) said RTC/RTE application determining a set of upstream directives based on said set of upstream connection quality measures;
   h) said RTC/RTE application presenting said set of upstream directives; and
   i) wherein:
      1) said set of upstream connection quality parameters includes at least one of an upstream RSSI parameter, an upstream SNR parameter, an upstream link speed parameter, and an upstream remaining bandwidth parameter;
      2) said set of values includes at least one of an upstream RSSI value, an upstream SNR value, an upstream link speed value, and an upstream remaining bandwidth value; and
      3) said set of upstream connection quality measures includes at least one of an upstream RSSI quality measure, an upstream SNR quality measure, an upstream link speed quality measure, and an upstream remaining bandwidth quality measure.

2. The method of claim 1 wherein said RTC/RTE application determines said upstream RSSI quality measure by comparing said upstream RSSI value to a set of upstream RSSI thresholds.

3. The method of claim 2 wherein said upstream RSSI quality measure is set to low when said upstream RSSI value is below a first upstream RSSI threshold within said set of upstream RSSI thresholds.

4. The method of claim 1 wherein said RTC/RTE application determines said upstream SNR quality measure by comparing said upstream SNR value to a set of upstream SNR thresholds.

5. The method of claim 4 wherein said upstream SNR quality measure is set to low when said upstream SNR value is below a first upstream SNR threshold within said set of upstream SNR thresholds.

6. The method of claim 1 wherein said RTC/RTE application determines said upstream link speed quality measure by comparing said upstream link speed value to a set of upstream link speed thresholds.

7. The method of claim 6 wherein said upstream SNR quality measure is set to low when said upstream link speed value is below a first upstream link speed threshold within said, set of upstream link speed thresholds.

8. The method of claim 1 wherein said RTC/RTE application determines said upstream remaining bandwidth quality measure by comparing said upstream remaining bandwidth value to a set of upstream remaining bandwidth thresholds.

9. The method of claim 8 wherein said upstream remaining bandwidth quality measure is set to low when said upstream remaining bandwidth value is below a first upstream remaining bandwidth threshold within said set of upstream remaining bandwidth thresholds.

10. The method of claim 1 further comprising:
   1) said wireless access point application listening to said socket for a connection request from said RTC/RTE application running on said RTC/RTE mobile device on said socket; and
   2) said RTC/RTE application requesting to connect said wireless access point application over said socket.

11. The method of claim 1 wherein said RTC/RTE application presents said set of upstream directives in an audio format or a video format.

12. A method for determining and providing upstream directives in real-time communication and real-time engagement over a wireless network, said method performed by an RTC/RTE application and a wireless access point application and comprising:
   a) creating a socket with a predetermined port on an IP address of a wireless access point by said wireless access point application running on a wireless access point, wherein said wireless access point is adapted to create a wireless network and is a Wi-Fi access point and wherein said predetermined port is a TCP port or a UDP port;

b) said wireless access point application establishing a connection with said RTC/RTE application running on an electronic device over said socket over said socket;
c) said wireless access point application determining a set of values of a set of upstream connection quality parameters of said electronic device;
d) said wireless access point application determining a set of upstream connection quality measures based on said set of values;
e) said wireless access point application sending said set of upstream connection quality measures to said RTC/RTE application over said socket;
f) said RTC/RTE application determining a set of upstream directives based on said set of upstream connection quality measures;
g) said RTC/RTE application presenting said set of upstream directives in an audio format or a video format; and
h) wherein:
 1) said set of upstream connection quality parameters includes at least one of an upstream RSSI parameter, an upstream SNR parameter, an upstream link speed parameter, and an upstream remaining bandwidth parameter;
 2) said set of values includes at least one of an upstream RSSI value, an upstream SNR value, an upstream link speed value, and an upstream remaining bandwidth value; and
 3) said set of upstream connection quality measures includes at least one of an upstream RSSI quality measure, an upstream SNR quality measure, an upstream link speed quality measure, and an upstream remaining bandwidth quality measure.

13. The method of claim 12 wherein:
1) said RTC/RTE application determines said upstream RSSI quality measure by comparing said upstream RSSI value to a set of upstream RSSI thresholds;
2) said RTC/RTE application determines said upstream SNR quality measure by comparing said upstream SNR value to a set of upstream SNR thresholds;
3) said RTC/RTE application determines said upstream link speed quality measure by comparing said upstream link speed value to a set of upstream link speed thresholds; and
4) Said RTC/RTE application determines said upstream remaining bandwidth quality measure by comparing said upstream remaining bandwidth value to a set of upstream remaining bandwidth thresholds.

14. The method of claim 13 wherein:
1) said upstream RSSI quality measure is set to low when said upstream RSSI value is below a first upstream RSSI threshold within said set of upstream RSSI thresholds;
2) said upstream SNR quality measure is set to low when said upstream SNR value is below a first upstream SNR threshold within said set of upstream SNR thresholds;
3) Said upstream SNR quality measure is set to low when said upstream link speed value is below a first upstream link speed threshold within said set of upstream link speed thresholds; and
4) said upstream remaining bandwidth quality measure is set to low when said upstream remaining bandwidth value is below a first upstream remaining bandwidth threshold within said set of upstream remaining bandwidth thresholds.

* * * * *